July 4, 1939.   J. G. SISSON   2,165,017
DIAL INDICATOR
Filed Feb. 5, 1937
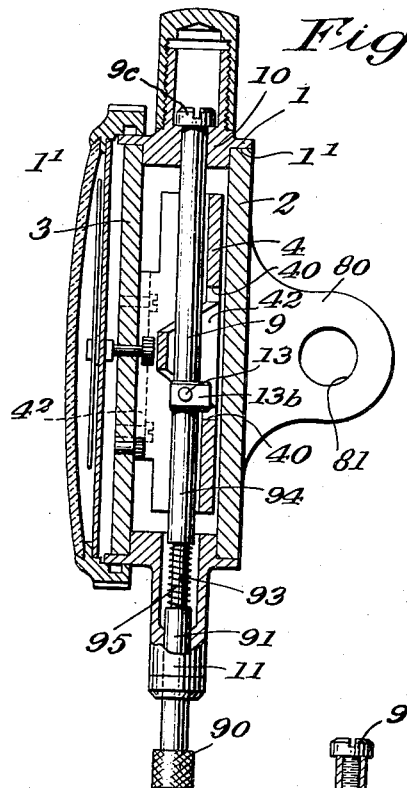
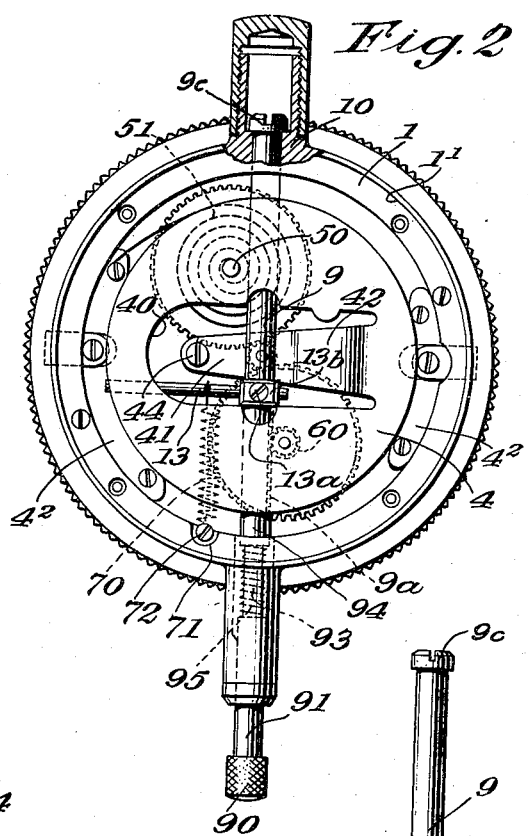
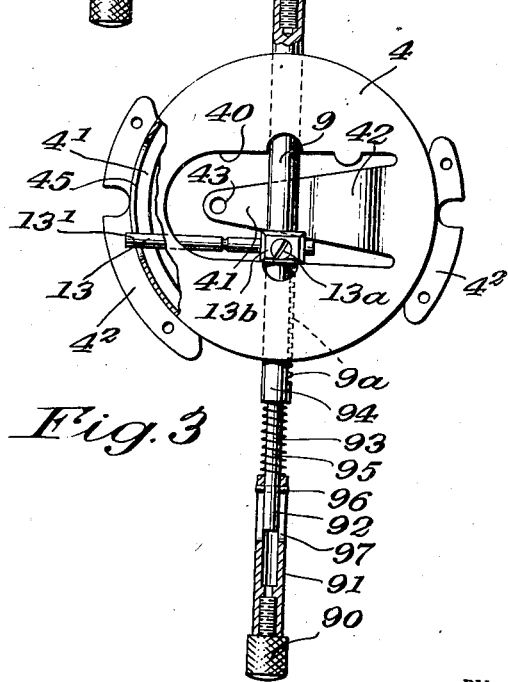
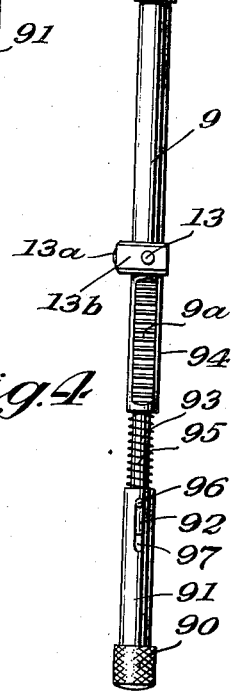
INVENTOR.
James G. Sisson
BY Spear Rawlings & Spear
ATTORNEYS.

Patented July 4, 1939

2,165,017

UNITED STATES PATENT OFFICE 2,165,017

DIAL INDICATOR

James G. Sisson, Athol, Mass., assignor to The L. S. Starrett Company, Athol, Mass., a corporation of Massachusetts Application February 5, 1937, Serial No. 124,239

2 Claims. (Cl. 33—172)

My present invention relates to certain structural improvements in the interior mechanisms of dial indicators. In my co-pending application, Serial No. 720,093 now Patent No. 2,074,279, granted March 16, 1937, I showed a dial indicator structure of great internal stability and of proved endurance in use.

One of the features therein shown and claimed is an internal bridge for guiding one end of the rack spindle or stem as tensioned by the direct action of the spindle spring. In operation, this spring normally yields to pressures on the spindle to control its movement and through it that of the indicating mechanism. Such indicators operated satisfactorily unless there was some accidental obstruction in the dial indicating mechanism or in comparable effect by sudden or violent impacts or shocks to which the indicating mechanism had not time to respond with an attendant lag which sometimes caused trouble. My present structure provides simple and efficient unitary spindle means which are so disposed and combined as to give a maximum balance, compensation, cushioning and smoothness in operation.

As illustrative of these I have shown in the accompanying drawing an internal structure for a dial gauge having a maximum stability against violent or abnormal shocks in indicator spindle contact.

Throughout the specification and drawing like reference numerals are employed to indicate corresponding parts, and in the drawing:

Fig. 1 is a central vertical sectional view through one of my improved indicators with spindle unit assembled.

Fig. 2 is an interior view of such an indicator with back plate removed to expose the interior in which the motion transmitting parts are indicated so far as pertinent herein.

Fig. 3 is a view indicating a rack spindle unit and guide bridge removed and partly sectioned to show the telescopic relation of the spindle sections, and Fig. 4 is a view of the spindle and guide viewed from the rack side of the spindle unit.

In the dial indicator structures according to my present invention, I provide the casing preferably as a tubular shell 1. This is recessed at its front and rear edges as at $1^1$ and fitted on its front with the dial plate 3 and on its rear with a back 2.

The bridge piece 4 is supported by the plate 3 each bracing the other and mutually cooperative to provide opposed bearings for various pinion or like elements supported by them as indicated herein.

The plate 3 is a rigid metal disc drilled for bearings for the hair spring gear shaft 50 and for that of the rack pinion 60. At their other ends these parts journal in aligned bearings in the bridge piece 4 mentioned above. This bridge piece is flanged as at $4^1$ and footed as at $4^2$ giving somewhat the form or appearance of a flat type of head covering or hat so that it is often called the "hat" piece.

Centrally of its flat top portion 4 the bridge is opened up by a somewhat U-shaped cut 40 leaving a tongue 41. As seen best in Fig. 1, this tongue 41 is bent downwardly as at 42 (see Fig. 1) until its end portion lies parallel to the plane of the piece 4 from which it was struck. Its tip is spaced from the plate 3 by a collar at 43 and held fixed to it by the screw 44. The feet $4^2$ of the bridge piece 4 are secured to this same plate 3 so that the bridge piece 4 is both internally and externally braced.

The bridge flange $4^1$ is slotted as at 45 to receive the end $13^1$ of the rack guide pin 13 of the rack spindle 9. The guide 13 is clamped by a set screw $13^a$ in a clip block $13^b$ which spans the rack spindle 9. The rack spindle is thus guided within the bridge as well as at the upper and lower bearings 10 and 11. These bearings are formed on the casing and are axially aligned and afford a rack guide combination with the intermediate bridge piece 4 and its parts, as hereinbefore described.

Referring to Figs. 1 and 2, it will be seen that the bridge piece 4 is interlocked in the assembly. The rack spindle generally indicated at 9 is guided adjacent its ends in the opposed axial bearings 10 and 11. These are the usual bearings for this type of dial gauge and assure complete alignment of the spindle axially of the bridge piece 4 in which it is also guided according to my invention. The rack spindle 9 has the usual rack teeth $9^a$ which mesh with the pinion 60 of the indicating train. The position of this rack varies, of course, with the size of the indicator and also with different types of gear trains used to transmit motion to the dial hand.

At its outer end the rack spindle 9 is fitted with a threaded anvil 90 which makes contact with the work in the usual manner being interchangeable and replaceable and, at its opposite or upper end, with a stop screw $9^c$. Such gauges may be supported in any usual way as by the ear 80 indicated in Fig. 1 and pierced for clamping as at 81 in any clamp or bracket.

I have indicated my rack spindle generally at 9 as it is essentially a self-contained removable and replaceable unit, but it is in fact made up in two sections, 91 which has the threaded anvil 90 and has its principal bearing in the lower case extension 11, and a slidable bearing or telescopic engagement at 92 with the reduced end 93 of the upper section 94.

Between the opposed major end diameters of the two sections of the unit and surrounding the reduced end 93 is a coiled spring 95 held under a predetermined compression by the pin 96 working in the slot 97.

This introduces into the rack spindle as a unit a zone of compressibility or resilient collapse between its ends so that when one of my new units is introduced as a spindle in one of the indicators in accordance with my prior inventions it becomes a protective factor in the combination. It provides for a cushioning within itself of sudden or extreme shocks on the spindle anvil 90.

In practice, the spring 95 of the unit 9 has a compressive resistance or strength superior to the spring 70 which is attached at one end to the guide 13 and at the other anchored to the casing in a recess 71 by a screw 72. Its strength is also slightly greater than the combined normal resistance of the spring 70 and the hair spring 51 on the gear shaft 50.

In operation, therefore, pressures on the spindle unit 9 as a whole are transmitted through the resistance of the spring 95 to operate the indicating mechanism of the device. If, however, the gear train becomes obstructed or the hand blocked, the spring 95 will yield to prevent damage to the indicating parts. Where such indicators are used on work subjecting the threaded anvil 90 to sudden shocks, the spring 95 intermediate of the sections of the spindle 9 yields instantly and in advance to protect lagging or obstructed parts.

As it is disposed in parallelism with and preferably generally adjacent the spring 70, it is in a position of maximum advantage in meeting sudden shocks and absorbing their effective force before that spring might have time to accommodate the unusual impact.

As the two sections 91 and 94 of the rack spindle 9 are assembled as a unit, the spindle may be removed without changing its resilient adjustment. In fact, these may be supplied as standard replaceable parts and can be substituted in standard indicators now on the market in accordance with my invention so as to give the owners of such indicators an option or choice as to the type of spindle to be used in assembly for any particular line of work. In other respects my indicators function and serve in the usual way, but with the increased stability and cushioning and self-protection as above indicated.

Various modifications may be made in the location of the dividing zone of the two sections which may vary according to their relative lengths and proportions to the spindle as a whole. The telescopic end interengagement is extremely simple, neat and efficient but obviously might be modified to get a slidable engagement and attachment.

What I therefore claim and desire to secure by Letters Patent is:

1. In a dial indicator, a casing having upper and lower bearings, an indicator train within said casing including a pinion, an upper spindle section disposed within said casing and having its upper end portion slidable in said upper bearing, a rack on said upper spindle section in mesh with said pinion, a spring acting constantly to urge said upper spindle section downwardly, a lower spindle section slidable in said lower bearing and having its lower end disposed exteriorly of the casing for work contact, a telescopic connection between the lower end portion of said upper section and the upper end portion of said lower section, stop means limiting outward telescopic movement of said spindle sections relative to each other, and a spring of greater strength than said first mentioned spring interposed between said spindle sections and tending constantly to urge said sections relatively apart to their limit of relative outward movement, the bearing engaging portions of said spindle sections being of equal external diameters and the portions of said spindle sections between said bearing engaging portions being of not greater diameter than said bearing engaging portions whereby said spindle sections are adapted to be used in lieu of a one-piece spindle of uniform external diameter throughout its length in a dial gauge having upper and lower spindle bearings of equal diameters.

2. A spindle unit for dial indicators comprising separate upper and lower sections having upper and lower bearing engaging portions of equal external diameters, respectively, the portions of said sections between their said bearing engaging portions being of not greater diameter than said bearing engaging portions, a telescopic connection between the adjacent ends of said sections, a rack on the upper section, means limiting relative outward movement of said sections, and a spring interposed between said sections and tending constantly to urge them to their limit of relative outward movement.

JAMES G. SISSON.